No. 619,898. Patented Feb. 21, 1899.
G. U. MERRILL.
WEIGHING APPARATUS.
(Application filed Apr. 6, 1898.)
(No Model.) 2 Sheets—Sheet 1.
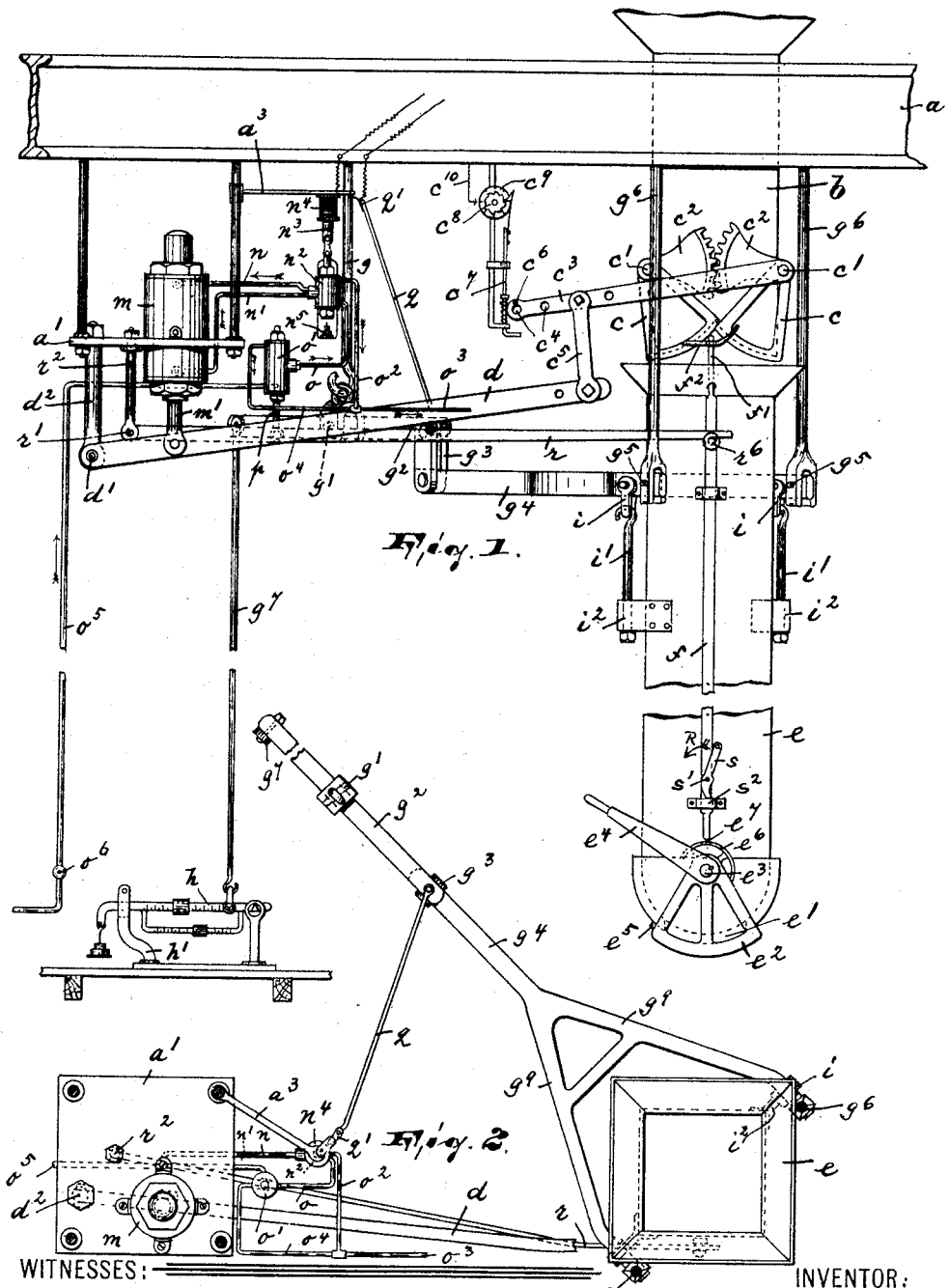

No. 619,898. Patented Feb. 21, 1899.
G. U. MERRILL.
WEIGHING APPARATUS.
(Application filed Apr. 6, 1898.)
(No Model.) 2 Sheets—Sheet 2.
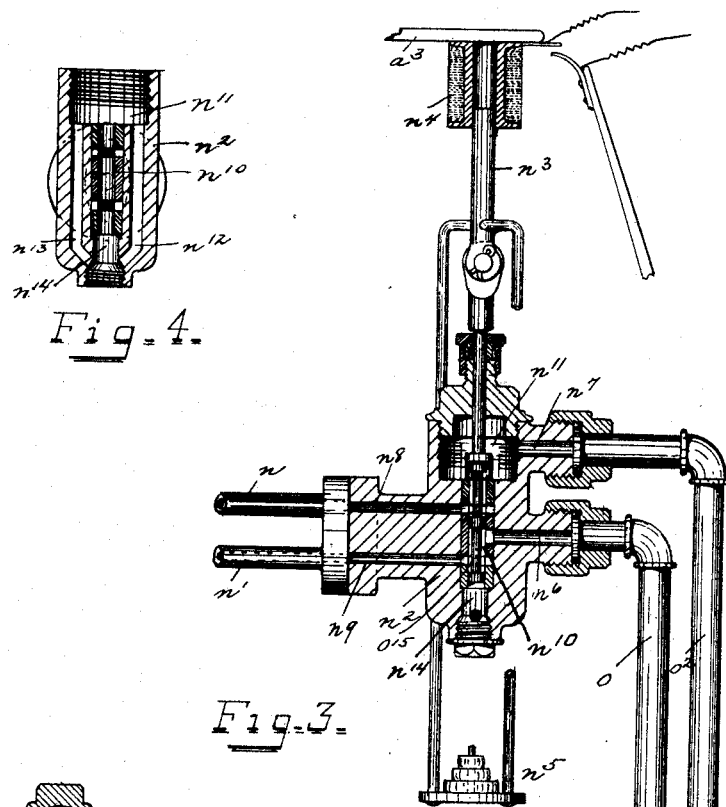
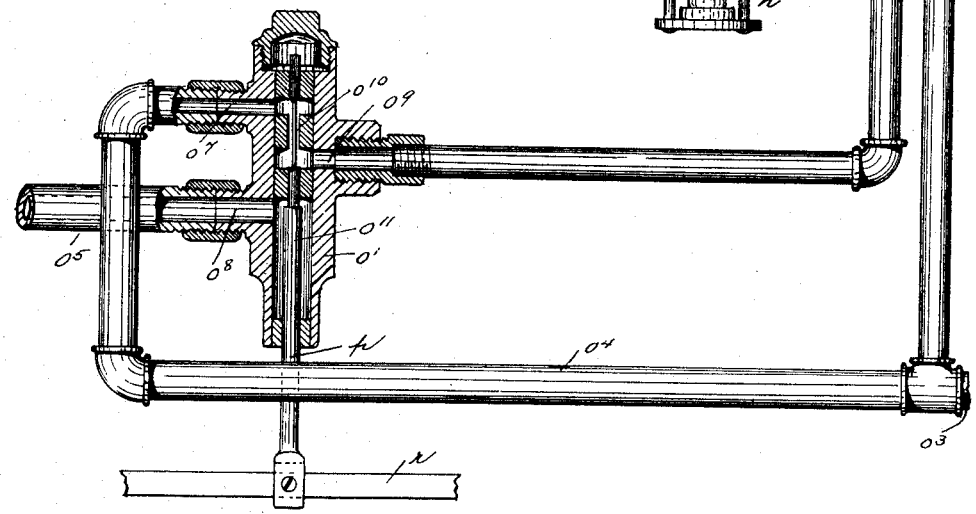
WITNESSES:
Wm. S. Bell.
INVENTOR
Grant U. Merrill,
BY
Gartner & Co.,
ATTORNEYS

UNITED STATES PATENT OFFICE.

GRANT U. MERRILL, OF PATERSON, NEW JERSEY.

WEIGHING APPARATUS.

SPECIFICATION forming part of Letters Patent No. 619,898, dated February 21, 1899.

Application filed April 6, 1898. Serial No. 676,634. (No model.)

*To all whom it may concern:*

Be it known that I, GRANT U. MERRILL, a citizen of the United States, residing in Paterson, county of Passaic, and State of New Jersey, have invented certain new and useful Improvements in Weighing Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide an automatic weighing apparatus for coal, grain, &c., by means of which any desired quantity can be accurately weighed and registered and accordingly the output regulated according to requirements, and whereby the clandestine removal or pilfering of the material passing through said weighing apparatus is entirely prevented.

The invention consists in the improved weighing apparatus, in the inlet and outlet controlling and operating means, in its register or indicator, and in the combination and arrangement of the various parts, substantially as will be hereinafter more fully described, and finally embodied in the clauses of the claim.

In the accompanying drawings, in which like letters of reference indicate corresponding parts in all the views, Figure 1 is a front elevation of my improved weighing apparatus with certain portions broken away and others shown in section to better illustrate the nature of my said invention; Fig. 2, a top plan view of Fig. 1, the supporting-platform, feed-hopper, register, and scale being removed. Fig. 3 is an enlarged detail view of two of the valves and the connections therefor employed in my apparatus, said valves being shown in section; and Fig. 4 is a transverse sectional view of a portion of one of said valves.

In said drawings, $a$ represents a platform supporting a vertically-arranged feed-hopper $b$, having its lower end provided with doors or gates $c\,c$, segmental-shaped and pivotally secured, as at $c'\,c'$, at opposite sides of the feed-hopper $b$.

On the axles $c'\,c'$ are securely mounted toothed arms or segments $c^2\,c^2$, meshing with each other, while a lever $c^3$ is securely mounted on one of said axles $c'$ for operating the same. The free end of said last-mentioned lever is provided with a series of holes $c^4\,c^4$, in which is adjustably secured one end of a link $c^5$, the other end of which is pivotally and adjustably connected to the inner end of a lever $d$, having its opposite end fulcrumed, as at $d'$, on a support or bracket $d^2$, carried by a platform $a'$, in turn supported by the platform $a$.

From the free end of the lever $c^3$ projects a pin $c^6$, adapted to operate a spring-controlled pawl $c^7$ in engagement with a ratchet-wheel $c^8$, on the axle of which is mounted an indicator-wheel $c^9$, coöperating with the pointer $c^{10}$, by means of which arrangement the operating of the lever $c^3$, and thus the opening and closing of the segmental-shaped doors $c\,c$, can be kept track of.

Below the feed-hopper $b$ and in alinement with its outlet is arranged a vertical chute or hopper $e$, the outlet-opening $e'$ of which is controlled by a segmental-shaped gate $e^2$, fulcrumed, as at $e^3$, to said chute or hopper and adapted to be operated by a handle $e^4$, while a stop $e^5$ is arranged on one side of the outlet $e'$, so as to limit the movement of the gate $e^2$ in its closing direction. Said segmental-shaped gate $e^2$ is provided with a curved bridge $e^6$, provided with a hole or opening $e^7$, adapted, when said gate $e^2$ is closed, to be engaged by a bolt $f$, slidingly arranged on one side of the chute or hopper $e$ and extending through the top portion thereof and adapted to engage with its upper end $f'$ a hole in a lug or projection $f^2$ on one of the segmental-shaped gates $c$ when the latter are in their closed or normal position.

To a post or bracket $g$, depending from the platform $a$, is pivotally secured, as at $g'$, a beam $g^2$, having one end connected by a link $g^3$ with one end of a bifurcated lever $g^4$, the other ends of which are pivotally secured, as at $g^5\,g^5$, to rods or brackets $g^6\,g^6$, secured to and depending from the platform $a$, while the other end of the beam $g^2$ is pivotally connected through a rod $g^7$ with the fulcrumed arm $h$ of a scale $h'$ of ordinary construction.

Near the free ends of the bifurcations $g^9\,g^9$ of the lever $g^4$ and between the fulcrums $g^5$ $g^5$ and the angle formed by said bifurcations are mounted shackles $i\,i$, connected by hooked rods $i'\ i'$ to brackets $i^2\ i^2$, which latter are secured to and project from the chute or hopper $e$, all as clearly illustrated in the drawings.

On the auxiliary platform $a'$ is securely mounted a cylinder $m$, the piston-rod $m'$ of which is pivotally connected with the lever $d$. The ports of said cylinder $m$ are connected by pipes $n\ n'$ with ports $n^8\ n^9$ of a valve $n^2$, the piston of which carries an iron core or armature $n^3$, adapted to be operated by a coil or solenoid $n^4$, suitably supported from a bracket $a^3$.

It must be remarked that the piston of the double-acting valve $n^2$ is weighted—that is to say, carries a depending weight $n^5$, for a purpose hereinafter stated.

One port $n^6$ of the double-acting valve $n^2$ is connected by a pipe $o$ with a port $o^9$ of an auxiliary valve $o'$, while the other port $n^7$ is connected, through a pipe $o^2$, with the exhaust $o^3$. The port $n^6$ communicates with the bore $n^{10}$ between the points of union with the latter of the ports $n^8$ and $n^9$, and the port $n^7$ communicates with a chamber $n^{11}$ in the upper end of the valve, which chamber has communication, through longitudinal ducts $n^{12}\ n^{13}$, with another chamber $n^{14}$ at the lower end of the valve. Hence when the valve-stem $n^{15}$ is lowered there is communication between ports $n^6$ and $n^9$ directly by way of the bore $n^{10}$ and between the ports $n^8$ and $n^7$ by way of the bore and the chamber $n^{11}$, and when said valve-stem is elevated there is communication between the ports $n^6$ and $n^8$ directly through the bore and between the ports $n^9$ and $n^7$ by way of the lower end of the bore, the chamber $n^{14}$, the ducts $n^{12}\ n^{13}$, and the chamber $n^{11}$. One port $o^7$ of the auxiliary valve $o'$ is likewise connected with the exhaust $o^3$ through a pipe $o^4$, while its other port $o^8$ is connected, through a pipe $o^5$, with the source of pressure and is provided with a stop-cock $o^6$. The port $o^9$ communicates with the bore $o^{10}$ of said valve $o'$ between the points of communication therewith of the ports $o^7$ and $o^8$. Hence when the valve-stem $o^{11}$ of said valve is lowered there is communication by way of said bore between ports $o^9$ and $o^7$, and when said valve-stem is elevated there is communication by way of said bore between the ports $o^8$ and $o^9$. The piston-rod $p$ of the auxiliary valve $o'$ is pivotally connected to a lever $r$, one end of which is fulcrumed, as at $r'$, to a depending rod or bracket $r^2$, while its other end rests upon a pin or antifriction-roller $r^6$, arranged on the vertical bolt $f$.

From the inner end of the beam $g^2$ projects upward a rod $q$, having arranged thereon, but insulated therefrom, a contact-spring $q'$, adapted to close the circuit and render the solenoid or coil $n^4$ operative in a manner hereinafter more fully described.

It must be remarked that the bolt $f$ is held in normal position—that is to say, in engagement with the hole in the bracket $f^2$ (projecting from the segmental-shaped gate $c$) by means of a latch $s$, pivotally secured on the bolt $f$, as at $s'$, and adapted to bear with its lower curved portion on the guide $s^2$, as clearly illustrated in Fig. 1 of the drawings.

When the chute or hopper $e$ is emptied and the cock $o^6$ in the inlet-pipe $o^5$ is closed, the scale and hopper balance. The weight or amount of coal wanted is then adjusted on the scale by shifting the weights in the usual manner, thus causing the beam $g^2$ to tilt, whereby the contact-spring carrying rod $q$ is moved upward and closes the circuit controlling the coil $n^4$. The core or armature $n^3$, carrying the piston for the double-acting valve $n^2$, is drawn into the coil $n^4$ and this opens communication through said valve between the pipes $e$ and $n$ by way of the port $n^6$, the bore $n^{10}$, and the port $n^8$. The latch $s$ is now thrown over in the direction of the arrow R, releasing the bolt $f$ and allowing the latter to drop into the opening $e^7$ of the curved bridge $e^6$, thereby unlocking the gates $c\ c$ and locking the gate $e^2$. As said bolt drops down the pin $r^6$ is moved out of contact with the free end of the fulcrumed lever $r$, which latter gradually swings downward, carrying with it the piston on the piston-rod $p$ of the auxiliary valve $o'$, thereby establishing a communication between the pipe $o^5$ and the pipe $o$. The cock $o^6$ is now opened and the pressure enters through the pipe $o^5$, auxiliary valve $o'$, pipe $o$, double-acting valve $n^2$, and pipe $n$ into the upper portion of the cylinder $m$, thereby forcing the piston in said cylinder downward and operating, through the fulcrumed lever $d$ and link $c^5$, the fulcrumed lever $c^3$, which latter in turn opens the segmental-shaped gates $c\ c$, as will be manifest. It must be remarked in connection with the above that while the lever $c^3$ is operated its projecting pin $c^6$ operates the spring-controlled pawl $c^7$, and thus registers the said opening of the gates in a manner clearly understood by those familiar with the art. The coal, grain, &c., is now dropping from the feed-hopper $b$ into the chute or hopper $e$, and as soon as the desired amount of weight has passed into the same the bifurcated lever $g^4$ is operated—that is to say, it tilts the beam $g^2$ and tips the scales. At that moment the rod $q$ is moved downward and breaks the circuit for the coil $n^4$. Simultaneously the piston of the double-acting valve $n^2$ by the weight $n^5$ is returned to its normal position, establishing a connection between the pipe $o$ and the lower portion of the cylinder $m$ through the valve by way of the port $n^6$, the bore $n^{10}$, and the port $n^9$ and allowing the exhaust from the upper portion of said cylinder $m$ to escape through the pipe $n$, said valve by way of the port $n^8$, the chamber $n^{11}$, and the port $n^7$, and pipe $o^2$ into the exhaust $o^3$. It should be remarked that the exhaust from the lower portion of the cylinder $m$ escapes through pipe $n'$, the valve $n^2$ by way of the port $n^9$, the lower portion of the bore $n^{10}$, the chamber $n^{14}$, the ducts $n^{12}$ and $n^{13}$, the chamber $n^{11}$, and the port $n^7$, and the pipe $o^2$ into the exhaust $o^3$. The piston in the cylinder $m$ is now forced upward, thereby operating the lever $d$ and, through the link $c^5$, the fulcrumed lever $c^3$, which latter in turn closes the gates $c\ c$. The bolt $f$ is now moved upward until its upper portion $f'$ engages the opening in the projecting lug $f^2$, thereby locking the gates $c\ c$ and unlocking the gate $e^2$. The latch $s$ having been returned to its normal position retains said bolt. While the bolt is being moved upward the pin $r^6$ operates the lever $r$—that is to say, swings the same upward—and, through the piston-rod $p$, intercepts the pressure from the pipe $o^5$ in the auxiliary valve $o'$. Any back pressure or overflow into the valve $n'$ escapes by passing through its port $o^9$, the upper portion of its bore $o^{10}$, and its port $o^7$, through the pipe $o^4$, into the exhaust $o^3$. As the segmental-shaped gate $e^2$ is now unlocked, the latter can be readily opened and the coal, grain, &c., discharged at will from the chute or hopper $e$. Whenever the chute or hopper $e$ is lightened, the weight on the scale again tilts the beam $g^2$, and accordingly closes the circuit for the coil $n^4$, and after the bolt $f$ has been moved downward or unlocked the above-described operation can be again repeated.

It will be observed that whereas the valve $n^2$ is one which depends entirely upon automatic actuation the valve $o'$ is practically manually operated, for its movement, as will be seen, depends entirely upon operation by hand of the bolt $f$ through the medium of its pivoted latch.

I do not intend to limit myself to the precise construction as shown and described, as various alterations can be made without changing the scope of my invention; but

What I claim as new, and desire to secure by Letters Patent, is—

1. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, and an electrically-controlled valve interposed between the cylinder and the pressure-supply and exhaust pipe respectively, substantially as and for the purposes described.

2. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, and means for locking the gates in normal position, substantially as and for the purposes described.

3. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, and an indicator operated by the arm or lever, substantially as and for the purposes described.

4. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, means for locking the segmental-shaped gates in normal or closed position, and an indicator controlled by the arm or lever connected with said gates, substantially as and for the purposes described.

5. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, a chute or hopper below the feed-hopper and in alinement therewith and provided with an outlet, a gate controlling said outlet, and a locking-bolt supported by said chute or hopper and adapted to lock the gate of the latter while simultaneously unlocking the gates of the feed-hopper or vice versa, substantially as and for the purposes described.

6. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, a chute or hopper below the feed-hopper and in alinement therewith and provided with a gate-controlled outlet, a fulcrumed bifurcated lever supporting said chute or hopper, a scale, and a beam connected with one end to the scale and with its other end to the free end of the fulcrumed bifurcated lever, substantially as and for the purposes described.

7. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, a chute or hopper below the feed-hopper and in alinement therewith and provided with a gate-controlled outlet, a fulcrumed bifurcated lever supporting said chute or hopper, a scale, a beam connected with one end to the scale and with its other end to the free end of the fulcrumed bifurcated lever, and a locking-bolt slidingly arranged on the chute or hopper and adapted to lock the gate of the latter and simultaneously unlocking the gates of the feed-hopper and vice versa, substantially as and for the purposes described.

8. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, a chute or hopper below the feed-hopper and in alinement therewith and provided with a gate-controlled outlet, a fulcrumed bifurcated lever supporting said chute or hopper, a scale, a beam connected with one end to the scale and with its other end to the free end of the fulcrumed bifurcated lever, a locking-bolt slidingly arranged on the chute or hopper and adapted to lock the gate of the latter and simultaneously unlocking the gates of the feed-hopper and vice versa, and means for locking the bolt in its uppermost or normal position, substantially as and for the purposes described.

9. In a weighing apparatus, the combination with a stationary vertical hopper provided with an outlet, two segmental-shaped fulcrumed coöperating gates controlling said outlet, an arm or lever connected with the fulcrum of one of said gates, a fulcrumed lever connected with said arm or lever, a cylinder and piston, a piston-rod penetrating said cylinder and connected with the fulcrumed lever, a pressure-supply and an exhaust pipe connected with said cylinder, an electrically-controlled valve interposed between the cylinder and the pressure-supply and exhaust pipe respectively, a chute or hopper below the feed-hopper and in alinement therewith and provided with a gate-controlled outlet, a fulcrumed bifurcated lever supporting said chute or hopper, a scale, a beam connected with one end to the scale and with its other end to the free end of the fulcrumed bifurcated lever, a locking-bolt slidingly arranged on the chute or hopper and adapted to lock the gate of the latter and simultaneously unlocking the gates of the feed-hopper and vice versa, an auxiliary valve interposed between the electrically-controlled valve and the pressure-supply pipe and connected with the exhaust, a piston carrying piston-rod penetrating said auxiliary valve, a fulcrumed lever connected with the last-mentioned piston-rod, and means carried by the bolt for controlling said last-mentioned fulcrumed lever, substantially as and for the purposes described.

10. In a weighing apparatus, the combination with a stationary vertical hopper provided with an outlet, two segmental-shaped fulcrumed coöperating gates controlling said outlet, a chute or hopper below the feed-hopper and in alinement therewith and provided with an outlet, a gate controlling the outlet of said chute or hopper, and a locking-bolt supported by said chute or hopper and adapted to lock the gate of the latter while simultaneously unlocking the gates of the feed-hopper and vice versa, substantially as and for the purposes described.

11. In a weighing apparatus, the combination with a stationary vertical hopper provided with an outlet, two segmental-shaped fulcrumed coöperating gates controlling said outlet, a chute or hopper below the feed-hopper and in alinement therewith and provided with an outlet, a gate controlling the outlet of said chute or hopper, a locking-bolt supported by said chute or hopper and adapted to lock the gate of the latter while simultaneously unlocking the gates of the feed-hopper and vice versa, and means for retaining the locking-bolt in its normal position, substantially as and for the purposes described.

12. In a weighing apparatus, the combination with a stationary vertical hopper provided with an outlet, two segmental-shaped fulcrumed coöperating gates controlling said outlet, a chute or hopper below the feed-hopper and in alinement therewith and provided with an outlet, a gate controlling the outlet of said chute or hopper, a locking-bolt supported by said chute or hopper and adapted to lock the gate of the latter while simultaneously unlocking the gates of the feed-hopper, and vice versa, a latch fulcrumed on the locking-bolt, and a guide for said bolt arranged on the hopper and adapted to be engaged by said fulcrumed latch, substantially as and for the purposes described.

In testimony that I claim the foregoing I have hereunto set my hand this 26th day of March, 1898.

GRANT U. MERRILL.

Witnesses:
ALFRED GARTNER,
LOUISE SNYDER.